United States Patent [19]

Mueller

[11] 4,351,558
[45] Sep. 28, 1982

[54] TRUCK BODY CONSTRUCTION

[76] Inventor: Frederick N. Mueller, 7637 El Pastel, Dallas, Tex. 75240

[21] Appl. No.: 32,390

[22] Filed: Apr. 23, 1979
(Under 37 CFR 1.47)

[51] Int. Cl.³ .............................................. B62D 27/02
[52] U.S. Cl. ...................................... 296/187; 52/282;
89/36 H; 296/31 P
[58] Field of Search ............... 296/187, 197, 188, 193;
105/394; 244/131, 132; 89/36 H, 40 B;
293/128, 126; 52/468, 282, 288, 780, 781;
403/705, 306, 312

[56] References Cited

U.S. PATENT DOCUMENTS

| | | | |
|---|---|---|---|
| 1,182,885 | 5/1916 | Bellamore | 89/36 H |
| 1,504,949 | 8/1924 | Gibbs | 89/36 H |
| 1,540,105 | 6/1925 | Cook, Jr. | 244/132 |
| 1,549,721 | 8/1925 | Kraft | 244/132 |
| 2,765,886 | 10/1956 | Tedaldi et al. | 52/781 X |
| 3,353,863 | 11/1967 | Koot | 296/187 |
| 3,699,842 | 10/1972 | Grewing et al. | 89/36 H |
| 3,974,608 | 8/1976 | Grearson | 52/282 X |
| 3,974,616 | 8/1976 | Beckley | 52/282 X |
| 4,011,698 | 3/1977 | Sklaar | 52/282 X |
| 4,059,303 | 11/1977 | Mauri | 296/187 |
| 4,066,285 | 1/1978 | Hall | 293/128 X |
| 4,148,515 | 4/1979 | Krap | 296/187 |

FOREIGN PATENT DOCUMENTS 1497184 8/1967 France ............................ 296/197

Primary Examiner—David M. Mitchell
Attorney, Agent, or Firm—Richards, Harris & Medlock

[57] ABSTRACT

An armored truck (10) utilizing an armored truck body (14) is provided. Fastening members (24, 26 and 28) are utilized to connect armor plates (22) to achieve the desired configuration and body size. Fastening members (24, 26 and 28) may include inwardly projecting members to allow for a truck body having interior walls (41) which are aligned and secured in a parallel relation with complementary armor plates (22). Fastening members (24, 26 and 28) may also incorporate as integral portions thereof an arcuate lip (62) for use as a rain gutter, a duct (36) for electrical wiring and a rub rail channel (50).

7 Claims, 13 Drawing Figures

1

TRUCK BODY CONSTRUCTION

TECHNICAL FIELD

This invention relates to vehicle body construction and more particularly to armored truck body construction.

BACKGROUND ART

Designers and builders of vehicle bodies have long been concerned with simple and economical constructions which are durable and safe, particularly with respect to truck bodies. Truck body design often places emphasis on function, durability and efficiency, rather than on form. Typical vehicle design generally consists of a separate frame for the engine and drive train with a body for cargo and passengers mounted to the frame. It has been the practice with commercial truck bodies and particularly with commercial armored truck bodies, to build the bodies to order, or to certain standards, but the construction has been, to a large extent, custom building, resulting in high cost.

Often, interior walls are provided as part of the truck body and separate supports which are attached to the exterior body must be provided for support and mounting of the interior walls.

Therefore, a need exists for a vehicle body which can be fabricated to a desired shape and size using sheet metal or armor plate and wherein integral supports are provided for mounting and support of interior walls, while being simple and economical to construct, without requiring special construction techniques or skills.

DISCLOSURE OF THE INVENTION

In accordance with the present invention, a vehicle body is provided which can be constructed to desired shapes and sizes using armor plate or other plate or sheet material. According to the invention, the armor plates are secured together by fastening members. The fastening members are preferably extruded shapes which include slots for the insertion of the armor plate and also may include inwardly projecting members which form an integral part of the fastening members for supporting and securing interior walls complementary to the armor plate or exterior walls of the vehicle body.

The fastening members are preferably extruded and can be constructed of any suitable material. The fastening members may also incorporate, as integral portions thereof, wiring ducts, rain gutters and rub rail channels.

The plate members are preferably secured to the fastening members by rivets. Different types of extrusions are provided for the floor, roof and sides of the vehicle body.

BRIEF DESCRIPTION OF THE DRAWINGS

A more complete understanding of the invention and its advantages will be apparent from the following detailed description taken in conjunction with the accompanying drawings in which.

DETAILED DESCRIPTION OF THE INVENTION

Figure 1:
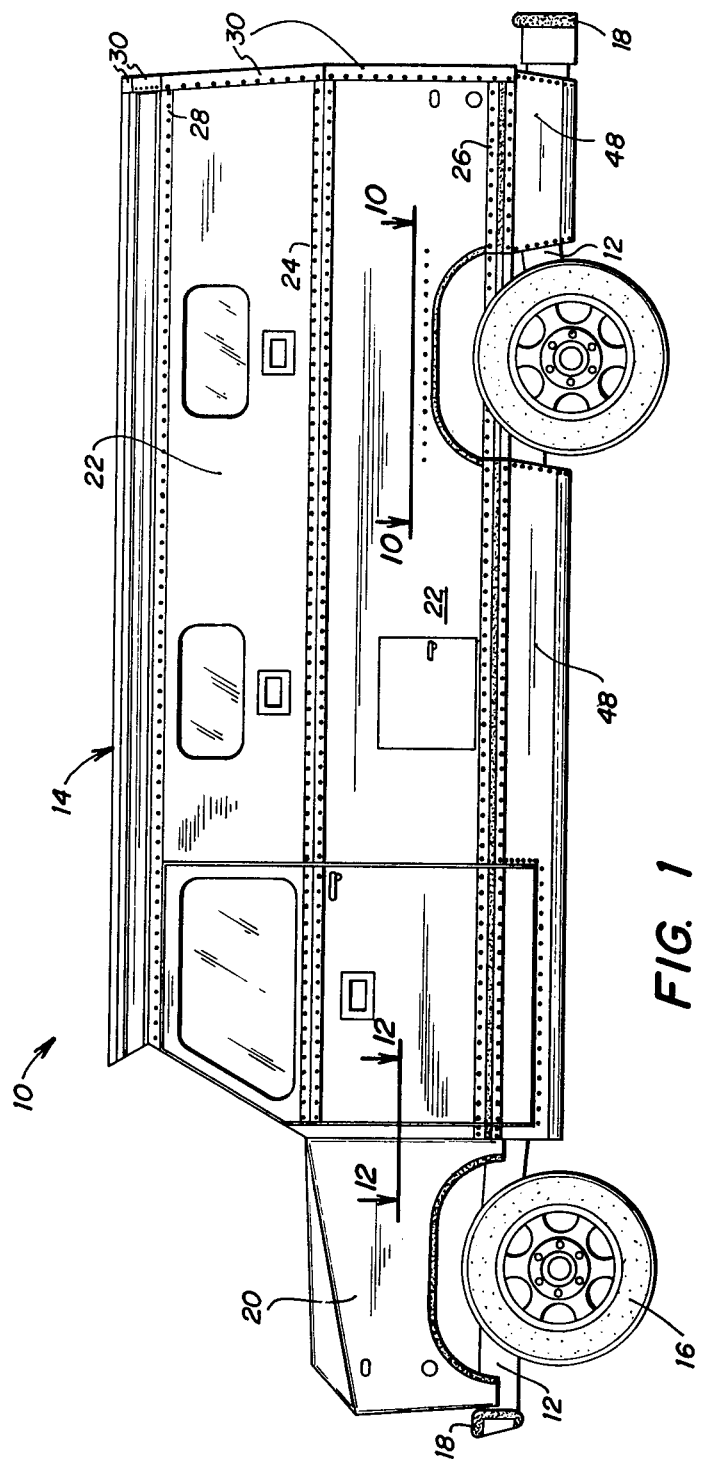
FIG. 1 is a side elevational view of one embodiment of an armored truck according to the present invention.

Referring now to the drawings and in particular to FIG. 1, there is illustrated an armored truck generally indicated by reference numeral 10, which truck includes a frame 12 and an armored truck body 14. Wheels 16, bumpers 18 and hood 20 of armored truck 10 are also indicated in FIG. 1. Armored truck body 14 includes armor plates 22, fastening members 24, 26 and 28 which extend longitudinally of truck body 14 and angle irons 30. As will be hereinafter described in further detail, armor plates 22 may be of any standard size, yet the desired configuration and size of armored truck body 14 may be achieved through the use of fastening members 24, 26 and 28 without any special fabricating or construction techniques.

Figure 2:
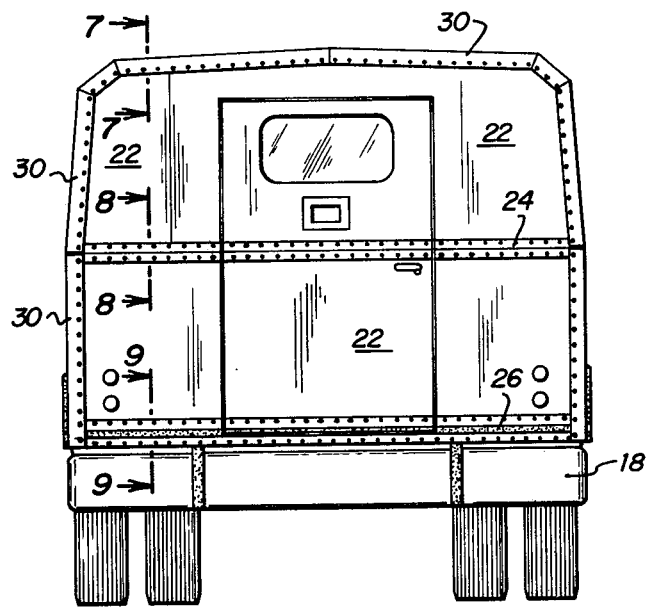
FIG. 2 is a rear elevational view of the armored truck shown in FIG. 1.

Referring now to FIG. 2, a rear elevational view of armored truck 10 shown in FIG. 1 is depicted. Construction of the rear of armored truck body 14 is similar to the side of armored truck body 14 shown in FIG. 1. FIG. 2 shows the location of fastening members 24 and 26, angle irons 30 and armor plates 22.

Figure 3:
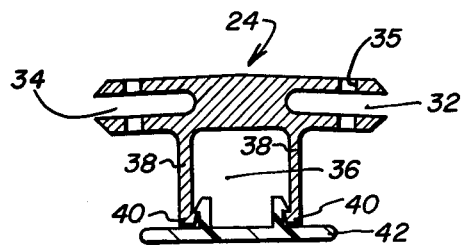
FIG. 3 is a cross-section elevational view of one extrusion used in the armored truck body shown in FIG. 1.
Figure 4:
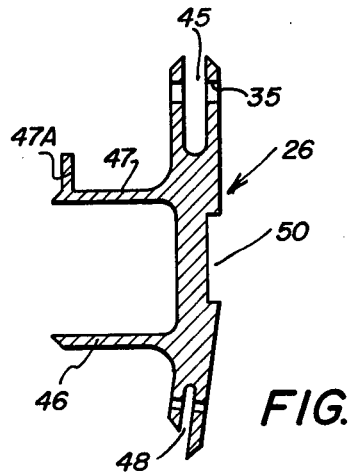
FIG. 4 is a cross-section elevational view of another extrusion used in the armored truck body shown in FIG. 1.
Figure 5:
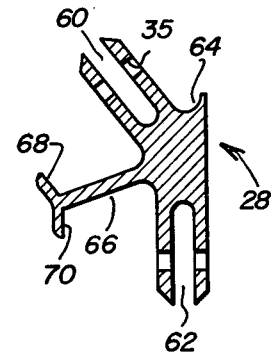
FIG. 5 is a cross-section elevational view of another extrusion used in the armored truck body of FIG. 1 and according to the present invention.

Referring now to FIGS. 3, 4 and 5 there is shown fastening members 24, 26 and 28, respectively. As shown in FIG. 3, fastening member 24 includes a first panel slot 32 and a second panel slot 34. Preferably, first panel slot 32 and second panel slot 34 have the same dimensions, and are dimensioned to allow insertion of armor plates 22 therein, as will be hereinafter described in further detail. Each of fastening members 24, 26 and 28 preferably contain rivet holes 35 for securing armor plates 22 thereto. Fastening member 24 may also include as in integral portion thereof a duct 36 formed by two inwardly projecting members 38. Duct 36 may be used to contain electrical wiring, for example. Inwardly projecting members 38 may also include locking flanges 40 as shown in FIG. 3. Locking flanges 40 allow a snap lock cover 42 to be locked in place over inwardly projecting members 38 for enclosing duct 36 and retaining interior walls 41 as will be hereinafter described. Preferably, snap lock cover 42 is constructed as shown in FIGS. 3 and 6, and can be coextensive with the particular fastening member which is complementary to it.

Figure 6:
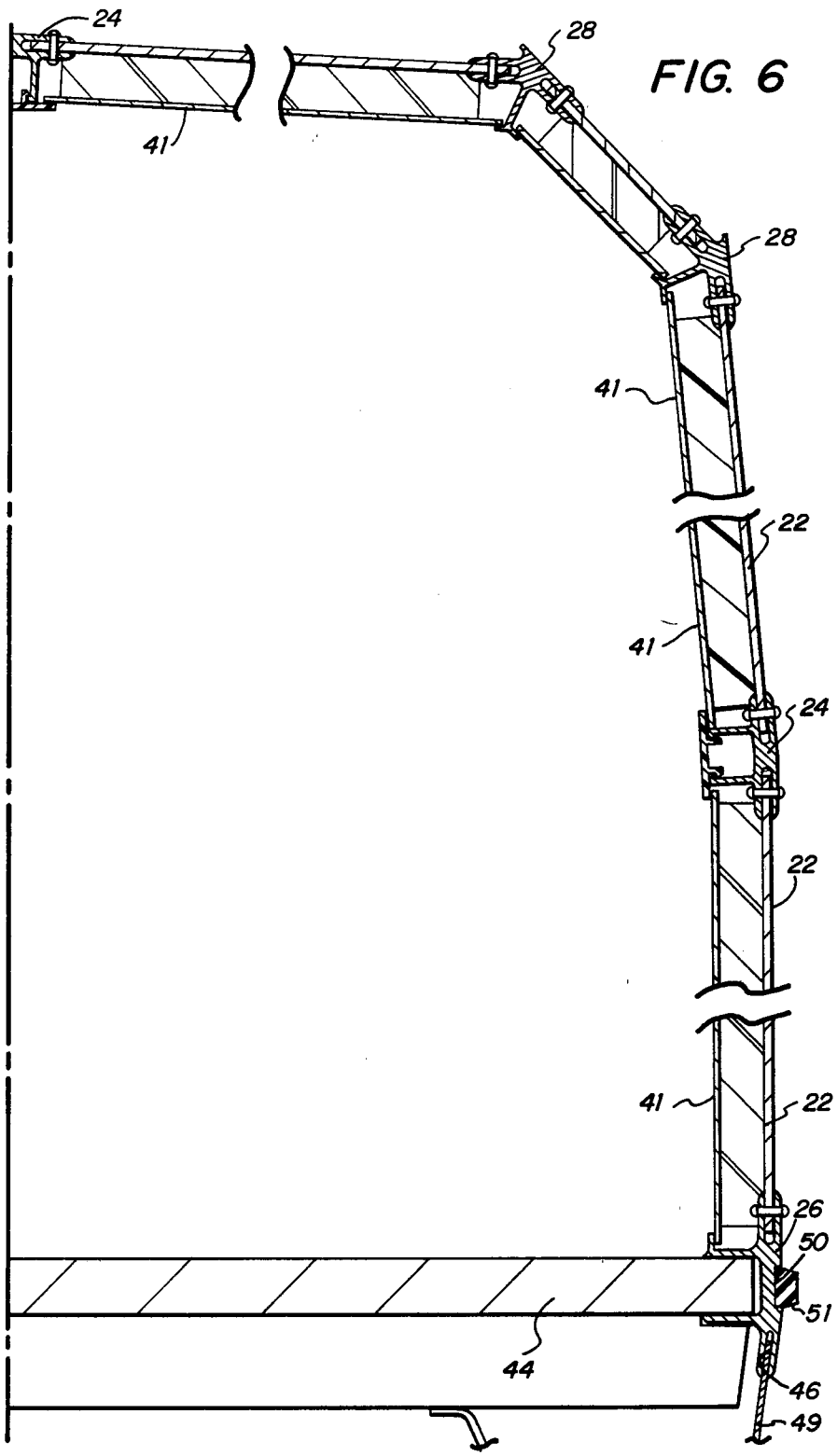
FIG. 6 is a sectional view of the armored truck body shown in FIG. 1 along lines 6—6 as shown in FIG. 1.

Fastening member 26, shown in FIG. 4, is employed in armored truck body 14 to secure armor plates 22 with floor 44 of armored truck body 14, as shown in FIG. 6. Fastening member 26 includes panel slot 45 dimensioned for insertion of an armor plate 22 therein. Two inwardly projecting members, lower inwardly projecting member 46 and upper inwardly projecting member 47 form a channel to allow insertion therein of floor 44. Upper inwardly projecting member 47 preferably includes an upwardly extending flange 47A which extends along the length of fastening member 26 for retaining an interior wall 41 in a parallel relation to the armor plate 22 which is complementary to it.

Preferably, fastening member 26 also includes a skirt slot 48 for securing skirt 49 of armored truck body 14 to fastening member 26. Also included in fastening member 26 and forming an integral part thereof is rub rail channel 50. Rub rail channel 50 permits the mounting of a rub rail therein, such as rubber rub rail 51 or a rub rail of any other suitable material.

Fastening member 28 is illustrated in FIG. 5 and includes a first panel slot 60 and second panel slot 62. First panel slot 60 and second panel slot 62 of fastening member 28 are similar to first panel slot 32 and second panel slot 34 of fastening member 24. Fastening member 28 preferably includes an arcuate lip 64 extending along the length of fastening member 28 as an integral portion thereof for use as a rain gutter. Fastening member 28 may also include an inwardly projecting member 66 having a first flange 68 and a second flange 70 at the end of inwardly projecting member 66. First flange 68 and second flange 70 of inwardly projecting member 66 are preferably essentially parallel to first panel slot 60 and second panel slot 62, respectively, so that an interior wall 41 may be secured and aligned in an essentially parallel relation with armor plates 22 secured by first panel slot 60 and second panel slot 62, respectively, as shown in FIG. 6.

Referring particularly to FIG. 6, there is illustrated a cross-section of part of armored truck body 14 along lines 6—6 of FIG. 1. FIG. 6 shows the interconnection of armor plates 22 with one another employing fastening members 24, 26 and 28. Fastening members 24, 26 and 28 are shown in engagement with interior walls 41. Interior walls 41 are preferably in essentially a parallel relation to the corresponding armor plates which are complementary with each interior wall 41. Fastening members 24, 26 and 28 are used to align and retain interior walls 41, together with snap-lock cover 42 which locks and encloses duct 36 of fastening member 24. Preferably, there will be incorporated insulating material 72 between armor plates 22 and interior walls 41. Insulating material 72 may be any type known to those skilled in the art suitable for such use and can be bonded to either armor plates 22 or interior walls 41 using a suitable adhesive. For example, rigid polyurethane foam may be used and bonded to armor plates 22 or interior walls 41 using a suitable adhesive, such as an adhesive sold under the trade name 801-Sealant sold by the 3M Company of St. Paul, Minnesota.

Figure 7:
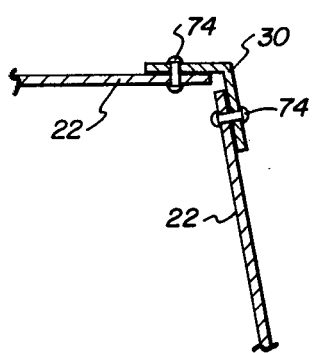
FIG. 7 is a cross-sectional view along lines 7—7 of FIG. 2.

Shown in FIG. 7 is a cut-away view of the rear of armored truck body 14 of armored truck 10 along lines 7—7 of FIG. 2. Angle iron 30 shown in FIG. 7 is used to connect armored plates 22 which form the top of armored truck body 14 with armor plates 22 which form the rear of armored truck body 14. Similar angle irons are used to connect armor plates 22 which form the sides of armored truck body 14 with armor plates 22 which form the rear of armored truck body 14.

Figure 8:
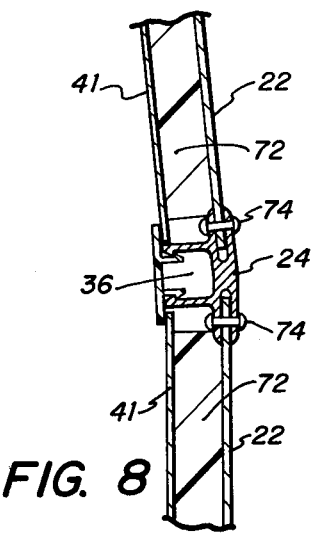
FIG. 8 is a cross-sectional view along lines 8—8 as shown in FIG. 2.

FIG. 8 shows a cross-sectional view along lines 8—8 of FIG. 2. Fastening member 24 is shown with armor plates 22 secured in first panel slot 32 and second panel slot 34 of fastening member 24 through the use of rivets 74. Interior walls 41 are secured and aligned by inwardly projecting members 38 and snap lock cover 42. Insulating material 72 is shown in position between armor plates 22 and interior walls 41.

Figure 9:
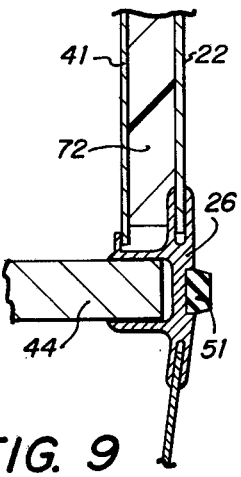
FIG. 9 is a cross-sectional view of the truck body shown in FIG. 2 along lines 9—9 of FIG. 2.

FIG. 9 shows a cross-sectional view along lines 9—9 of FIG. 2. Thus, it can be seen that the construction in the rear of armored truck body 14 is similar to the construction of the side of armored truck body 14 as shown in FIG. 6, with fastening members 24 and 26 extending longitudinally along the rear of armored truck body 14.

Figure 10:
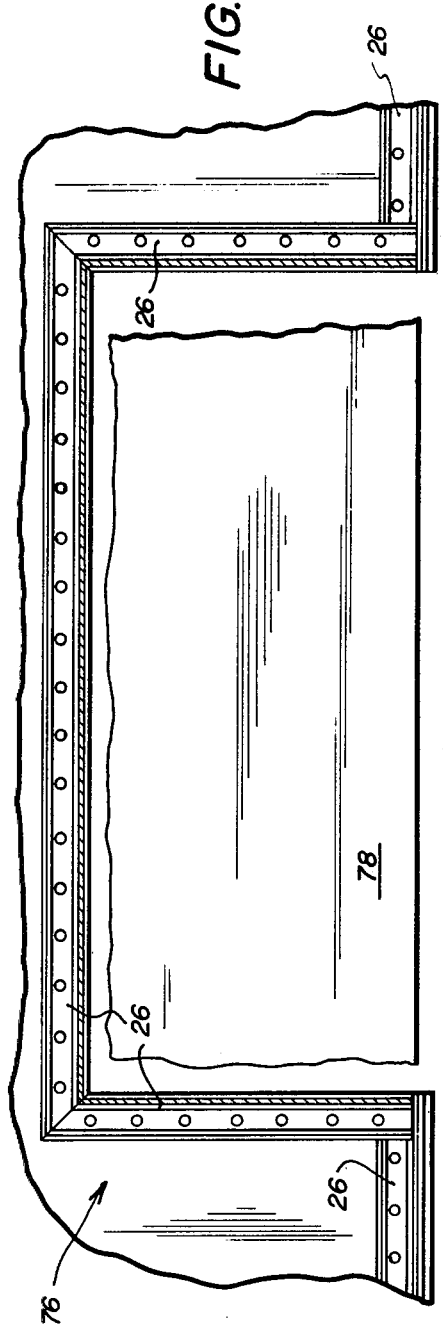
FIG. 10 is a view partially broken away of the rear wheel well area of the armored truck body along lines 10—10 of FIG. 1.
Figure 11:
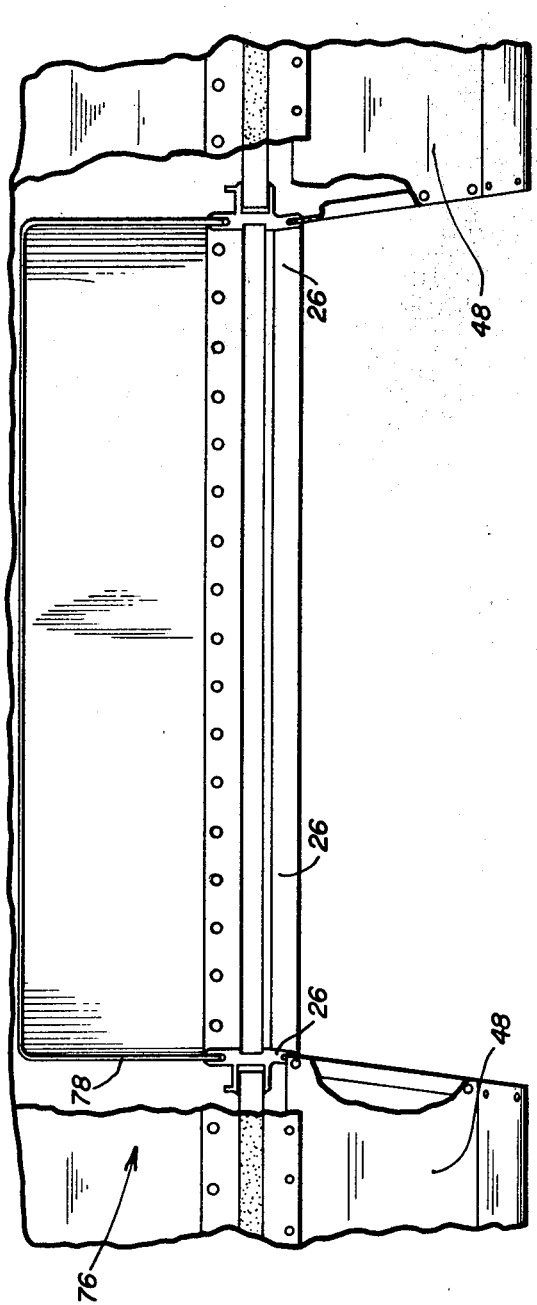
FIG. 11 is a side view partially broken away of the detail shown in FIG. 10.

Shown in FIG. 10 is a top elevational view of the wheel well constructed in accordance with the invention and generally indicated by reference numeral 76. Wheel well bracket 78 of wheel well 76 is shown partially cut away in FIG. 10. Wheel well bracket 78 is also shown in position in FIG. 11 which is a side cross-sectional view of wheel well 76. Fastening members 26 are used for wheel well construction 76 which incorporate rub rails 51 therein.

Figure 12:
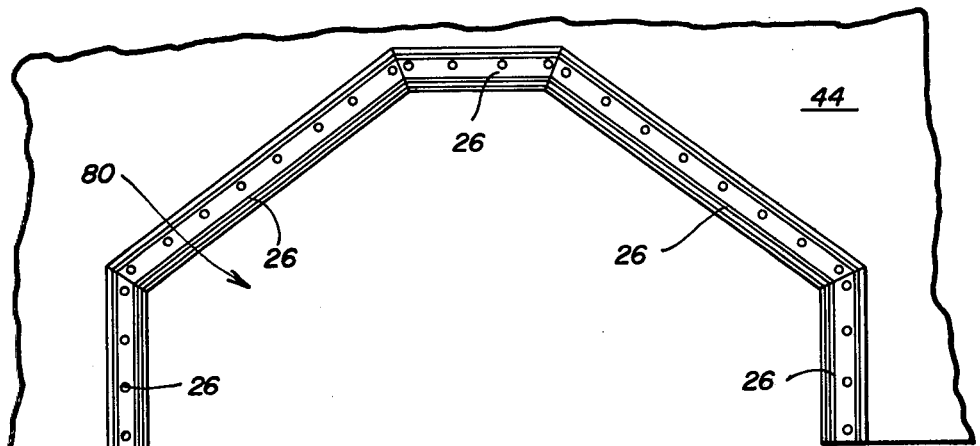
FIG. 12 is a view partially broken away of the drivetrain cut-out of the armored truck body along lines 12—12 of FIG. 1.
Figure 13:
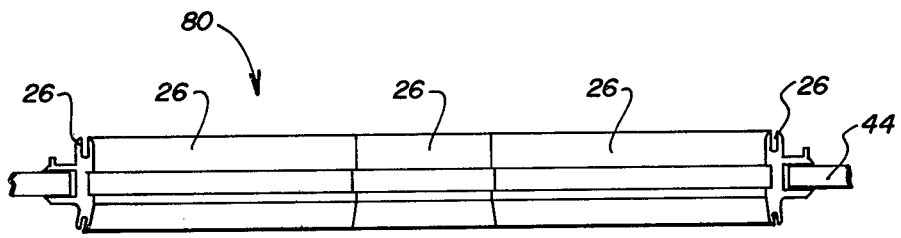
FIG. 13 is a front elevational view of the detail shown in FIG. 12.

In the particular truck body described herein, a drivetrain cut-out 80 is located in the center front of armor truck body 14 and is shown in FIGS. 12 and 13. Drivetrain cut-out 80 is shaped to the desired configuration by using several lengths of fastening members 26 with the edges thereof cut at the desired angle.

As shown in FIGS. 1 and 2, armored truck body 14 may also incorporate at the desired locations windows, doors, tail lights, side reflectors and other typical accessories.

According to the present invention, a vehicle body is provided which is simple and economical to construct, yet allows for building of the vehicle body in numerous sizes and configurations without the requirement for special construction techniques or expensive dies or forgings. For example, fastening members 24, 26 and 28 may be extruded from aluminum in standard lengths and cut to achieve the required length for the particular application. Similarly, standard size armor plate or non-armor panels can also be employed for exterior walls and roof to achieve the desired size and vehicle body configuration merely by determining the number of armored plates or panels that are required. The truck body according to the invention can be constructed with little or no welding thereby reducing the number of specialized craftsmen required to build a vehicle body.

While the invention has been described with respect to its preferred embodiments, it will be evident that numerous modifications and rearrangements are possible without departing from the scope of the invention.

I claim:

1. A vehicle body comprising:
   (a) a plurality of exterior planar panels forming the top, front, side and rear of the exterior vehicle body;
   (b) a floor;
   (c) fastening members for securing said panels, said fastening members having a first exterior panel slot for securing one panel and a second exterior panel slot for securing another of said exterior panels with said exterior panels being secured in a predetermined configuration, said configuration determined by the relation of said first and second exterior panel slots, said exterior panel slots being dimensioned for insertion of exterior panels therein, said fastening members also including at least one inwardly projecting member including flange means for securing at least one interior panel in approximately parallel relationship to a corresponding exterior panel; and (d) floor fastening members for securing the floor to selected ones of said exterior panels of the vehicle body, said floor fastening members having the slot for allowing insertion therein of said selected ones of said exterior panels, and inwardly projecting members forming a channel to allow insertion therein of the floor and a downwardly projecting slot for allowing insertion of a skirt therein.

2. The vehicle body as recited in claim 1 wherein said vehicle body incorporates a first type of fastening member forming said floor fastening member for securing the floor of said vehicle with the side and rear exterior panels of the body and a second type of fastening member for securing exterior side panels together in approximately the same plane and a third type of fastening member for securing exterior side and top panels together, the intersection of the planes in which said exterior side and top panels lie form an angle including the inwardly projecting member of about 140°.

3. The vehicle body as recited in claim 2 wherein one of said inwardly projecting members of said first type of fastening member terminates with a flange for aligning and securing an interior panel in approximately a parallel relation to the corresponding exterior panel, said first fastening member further including a rub rail channel for inserting and securing therein a rub rail and said second type of fastening member includes a pair of inwardly projecting members forming a duct which extends along the length of said second type of fastening member and said third type of fastening member includes an arcuate lip located on the exterior of said third type of fastening member for use as a rain gutter, said third type of fastening member further including an inwardly projecting member terminating in a first flange and a second flange, said flanges for aligning and securing interior panels complimentary with and spaced apart from the exterior panels in approximately a parallel relationship.

4. The vehicle body as recited in claim 1 wherein said vehicle body incorporates said floor fastening members for securing the floor of said vehicle with the side and rear exterior panels of the body and a fastening member for securing exterior panels together, the intersection of the planes in which said exterior panels lie form an angle including the inwardly projecting member of from about 180° to about 170° and another fastening member for securing exterior panels together, the intersection of the planes in which said exterior panels lie form an angle including the inwardly projecting member of from about 130° to about 150°.

5. The vehicle body as recited in claim 1 wherein said inwardly projecting members of said floor fastening members for connecting said exterior panels with said floor includes upper and lower spaced apart inwardly projecting members for allowing said floor of said vehicle body to be secured between said members, said floor fastening members further including flange means including an upwardly extending flange on said upper inwardly extending member for retaining an interior panel in approximately parallel relationship to the corresponding exterior panel.

6. In a vehicle body having top, front, side and rear exterior panels and a floor panel, a fastening member for use in securing the top, front, side and rear exterior panels and said floor panel in a desired relation and configuration, said fastening member comprising a member having a first exterior panel slot and a second exterior panel slot for securing two exterior panels together in a predetermined relation, said relation being determined by the relation of said first exterior panel slot to said second exterior panel slot, said exterior panel slots being dimensioned to allow insertion therein of said exterior panels, said member also including at least one inwardly projecting member including flange means for securing at least one interior panel in approximately parallel relationship to a corresponding exterior panel, wherein said fastening member has two inwardly projecting, spaced apart members forming a duct, said duct dimensioned for allowing electrical wiring to be contained therein and said flange means includes a flange at the end of each inwardly projecting member on the interior of said duct for allowing a cover to be locked in place over said duct, said cover overlapping said duct for providing flanges for securing a first interior panel and approximately parallel relationship to first exterior panel and for securing a second interior panel in approximately parallel relationship to said second exterior panel.

7. The fastening member as recited in claim 6, wherein said fastening members are symmetrical about a bisecting plane for interchangeable use on either side of said vehicle body.

* * * * *